United States Patent [19]

Sato et al.

[11] 4,418,045

[45] Nov. 29, 1983

[54] METHOD FOR DISPOSAL OF WASTE GAS AND APPARATUS THEREFOR

[75] Inventors: Takahisa Sato; Keizo Maruyama, both of Himeji; Kunio Sano, Ako, all of Japan

[73] Assignee: Nippon Shokubai Kagaku Kogyo Co., Ltd., Osaka, Japan

[21] Appl. No.: 302,219

[22] Filed: Sep. 14, 1981

[30] Foreign Application Priority Data

Sep. 19, 1980 [JP] Japan ................................ 55-129218
Sep. 24, 1980 [JP] Japan ................................ 55-131698

[51] Int. Cl.$^3$ ............................................ B01D 53/36
[52] U.S. Cl. ................................... 423/245; 423/247; 423/210
[58] Field of Search ......................... 423/210, 245, 247

[56] References Cited

U.S. PATENT DOCUMENTS 1,900,751  3/1933  Baehr ............................. 423/533 X
1,945,811  2/1934  Jaeger ............................ 423/533
2,756,121  7/1956  Grimes ........................... 423/247 X
3,393,047  7/1968  Steinmetz-Schmaltz ........... 423/402
3,988,423 10/1976  Ohrui et al. ..................... 423/247

FOREIGN PATENT DOCUMENTS 54-103781  8/1979  Japan ............................. 423/245

Primary Examiner—Earl C. Thomas
Attorney, Agent, or Firm—Behr & Adams

[57] ABSTRACT

A method for the disposal of waste gas, which method comprises (a) heating the incoming waste gas containing hydrocarbons, carbon monoxide, and other inflammable organic compounds with the gas obtained by removing heat from the outlet gas of the catalytic-oxidation reactor, (b) further heating the resultant hot waste gas with part of the outlet gas of the catalytic-oxidation reactor, (c) subjecting the heated waste gas to complete oxidation in the catalytic-oxidation reactor thereby rendering the waste gas no longer noxious, (d) diverting part of the outlet gas of the catalytic-oxidation reactor to be used for heating the aforementioned heated waste gas, (e) causing at least part of the outlet gas of the reactor which has been used for heating the waste gas to mingle with the remainder of the outlet gas of the reactor, (f) causing the remainder of the outlet gas of the reactor which has been used for heating the waste gas to mingle with the aforementioned heated waste gas, and (g) subjecting to heat recovery the mixture of the remainder of the outlet gas of the reactor with at least part of the outlet gas of the reactor which has been used for heating the waste gas.

8 Claims, 6 Drawing Figures

METHOD FOR DISPOSAL OF WASTE GAS AND APPARATUS THEREFOR

BACKGROUND OF THE INVENTION

1. Field of the Invention

This invention relates to a method for the disposal of waste gas and to apparatus therefor. More particularly, this invention relates to a method for the disposal of waste gas emanating from the process of production of chemicals to ensure complete oxidation of hydrocarbons, carbon monoxide, and other inflammable organic compounds contained in the waste gas and to apparatus used for the disposal of the waste gas.

2. Description of Prior Arts

Waste gases which occur at plants for production of chemicals contain hydrocarbons of 1 to 6 carbon atoms such as methane, ethane, ethylene, propane, and propylene, carbon monoxide, and inflammable organic compounds such as organic acids, aldehydes, esters, and alcohols and, moreover, entrain substances of offensive odor in large amounts. It is irrefutabley undesirable that such inflammable compounds should be left diffusing into the air. Particularly, removal of offensive odor from the waste gas has been in strong demand. A variety of processes developed for the elimination of such compounds have been proposed to the art.

The conventional waste-gas disposal processes for the removal of such offensively smelling substances and other noxious substances include those represented by the flow sheets of FIG. 1 and FIG. 2, for example. In the process of FIG. 1, a waste gas containing inflammable compounds and supplied via a conduit 1 is forwarded through a booster fan 2 optionally installed to suit the occasion, then heated in a heat exchanger 3, and forwarded via a conduit 4 to a heater 5, there to be heated with the heat supplied by an external heat source. The waste gas thus heated is sent to a catalytic oxidation reactor 6 packed with a catalyst having a noble metal such as platinum dispersed and carried on an activated alumina. In this reactor, the waste gas is completely burnt. The combustion gas is subsequently fed via a conduit 7 to a heat recovery unit 8, there to be deprived of the heat. The combustion gas consequently cooled through loss of heat is fed to the heat exchanger 3 and used therein for the purpose of heating the waste gas delivered via the conduit 1. Finally, the gas is released into the air through a stack 9. When the quantity of the heat generated by the waste gas supplied to the aforementioned catalytic-oxidation reactor 6 is too large, it is diluted with the air introduced through an air supply fan 10 for dilution of the heat generated by the waste gas.

In the process of FIG. 2, a waste gas containing inflammable compounds and fed in via a conduit 11 is forwarded via a booster fan 12 optionally installed to suit the occasion, then heated in a heat exchanger 13, and delivered via a conduit 14 to a catalytic-oxidation reactor 16 packed with a catalyst having a noble metal such as platinum dispersed and carried on an activated alumina. In the reactor 16, the waste gas is completely burnt. The combustion gas is subsequently fed via a conduit 17 to a heat recovery unit 18, there to be deprived of the heat. The combustion gas which is cooled by the loss of its heat is supplied to a heat exchanger 13, there to be utilized for the purpose of heating the waste gas delivered via the conduit 11. Thereafter, the gas is released into the air through a stack 19. In this case, part of the combustion gas emanating from the catalytic-oxidation reactor 16 is forwarded through a branched conduit 20 and mingled with the heated waste gas being forwarded by a fan 21 through the conduit 14 so as to elevate further the temperature of the waste gas and enhance the thermal efficiency of the process. Part of the combustion gas forwarded through the branched conduit 20 may be supplied via a branched conduit 22 to the heat exchanger 13. When the quantity of the heat generated by the waste gas fed to the catalytic-oxidation reactor 16 is too large, the gas emanating from the heat recovery unit 18 may be partly circulated via a conduit 23.

In either case, since the waste gas containing hydrocarbons, carbon monoxide, and other inflammable organic compounds is catalytically oxidized completely to an extent of being completely freed of noxiousness within the catalytic-oxidation reactor, this reactor is provided with a varying method for preventing possible short pass of the reaction gas.

Generally, when a waste gas containing inflammable organic compounds, particularly paraffinic hydrocarbons, is disposed by a process using a catalyst intended to ensure complete oxidation of such organic compounds, the preconditions for effective operation of this process are as follows:

(1) The gas temperature at the outlet of the catalyst bed should be substantially constant. It is said that the catalyst withstands heat to 700° to 720° C. It is not desirable to operate the catalytic-oxidation reactor at temperature conditions such that the gas temperature at the outlet of the catalyst bed falls short of reaching 650° C., because the combustion of paraffinic hydrocarbons, particularly propane, becomes incomplete under such temperature conditions. The operation, therefore, should be carried out so that the outlet gas temperature will remain on the average level of about 680° C.

(2) By reason of the catalytic activity, the gas temperature at the inlet to the catalyst bed should be not less than 250° C.

(3) The heat generated by the inlet gas to the catalytic-oxidation reactor should be controlled so that the temperature of self elevation in the catalyst bed will remain within a range of 430° C. (680°–250° C.). Notwithstanding this requirement, since the quantity of the heat generated by the waste gas under treatment is large and the amplitude of the change in the quanity of this heat is also large, the process itself should be such as to provide treatment of the waste gas stably.

The inventors made a study in search for a method of waste gas disposal with the foregoing preconditions in mind. They have consequently acquired a knowledge that the following points are indispensable to fulfilment of the preconditions.

(A) Maximum recovery of heat

An effort to lower the temperature of the treated waste gas to be released into the air to the fullest possible extent has its own limit from the economic point of view. It is, therefore, important that the increase in the volume of the waste gas (due to introduction of fresh air, for example) should be avoided by all means. To ensure the maximum recovery of heat, the process should be designed so that the temperature of the gas released into the air will be kept constant as much as possible against possible variation in the quantity of the heat generated by the incoming waste gas.

(B) Reuse of waste gas after treatment.

In the waste gas which has undergone the whole process, virtually all the inflammable substances have been removed and the oxygen concentration has been lowered as well. This waste gas, therefore, if desired to be utilized as an inert gas in various applications such as, for example, in sealing tanks which store dangerous substances.

For the process of FIG. 1 to continue to satisfy the aforementioned preconditions and, at the same time, fulfil the requirements of (A) and (B), there is inevitably entailed a disadvantage that the process necessitates the service of the heater 5 or an inconvenience that the volume of the waste gas is increased by the introduction of air for the dilution of the heat generated by the waste gas. The waste gas emanating from the catalytic-oxidation reactor 6, on reaching the heat recovery unit 8, contributes its heat to the generation of steam. It is further utilized for heating the incoming waste gas before it is finally released into the air. When the quantity of the heat generated by the incoming waste gas is large, the outlet gas temperature of the reactor is proportionally high. For effective control of the outlet gas temperature, therefore, air must be introduced from the ambience into the waste gas. This addition of air has an inevitable effect of increasing the total volume of the waste gas and consequently increasing the quantity of the heat entrained by the gas. It also brings about a disadvantage that the constancy of the oxygen concentration in the outlet gas is impaired and the reuse of the treated waste gas is inconvenienced. Conversely when the quantity of the heat generated by the incoming waste gas is low, the inlet gas temperature of the catalytic-oxidation reactor must be elevated so as to maintain the outlet gas temperature of the catalytic-oxidation reactor constant at the specified level. This necessitates the service of the temperature elevation heat exchanger 5. To ensure complete oxidation of the inflammable compounds in the waste gas, the outlet gas temperature of the catalytic-oxidation reactor must be maintained at a level of about 680° C. and, for that purpose, the inlet gas temperature of the catalytic-oxidation must be elevated proportionally. Thus, the heat source used for the process is required to be capable of supplying heat of so much higher temperature. When the quantity of the heat generated by the waste gas is such as to involve a temperature of 370° C. for self elevation, for example, the outlet temperature of the catalystic-oxidation reactor cannot be maintained at 680° C. unless the inlet temperature is adjusted to 310° C. Consequently, the heat source must be capable of supplying heat of about 350° C. In ordinary chemical plants, it is difficult to find a heat source of a high temperature of the order of 350° C. In actuality, therefore, such chemical plants have to depend on fuel of some sort or other to supplement their meager heat sources.

In the process of FIG. 2, in order that the process may satisfy the aforementioned preconditions and, at the same time, fulfil the requirements of (A) and (B), the apparatus for the waste gas disposal is designed on the basis of the conditions prevailing while the quantity of the heat generated by the incoming waste gas is at its peak. To be specific, in order to maintain the outlet gas temperature of the catalytic-oxidation reactor at 680° C., the apparatus is designed so that the outlet temperature of the heat exchanger 13 remains at 680° C. minus (the temperature of self elevation while the quantity of the heat generated is at its peak). If this temperature is not more than 250° C., part of the outlet gas from the catalytic-oxidation reactor is diverted to be utilized for elevating the inlet temperature of the catalytic-oxidation reactor. This diverted gas is only effective in elevating the inlet gas temperature of the catalytic-oxidation reactor and not effective at all in elevating the outlet gas temperature of the same reactor. When the quantity of the heat generated by the incoming waste gas is lowered, therefore, it is no longer possible to maintain the outlet gas temperature of the catalytic-oxidation reactor at 680° C. by suitably increasing or decreasing the volume of the diverted gas. It becomes necessary to elevate the outlet temperature of the heat exchanger 13. For this purpose, it is necessary to bypass the heat recovery unit 18 and divert part of the outlet gas of the reactor 16 to the heat exchanger 13 enough to elevate the temperature of the incoming waste gas. As an inevitable consequence, the temperature of the treated waste gas flowing through the stack 19 is elevated and the ratio of heat recovery is heavily degraded.

When the waste gas containing hydrocarbons, carbon monoxide, and other inflammable organic compounds is to be completely oxidized by the catalytic reaction, the apparatus is desired to be operated so that the interior temperature of the reactor, particularly the outlet gas temperature of the catalytic-oxidation reactor may be maintained constantly at an average level of about 680° C. In this case, it is desirable even from the economic point of view to minimize the cross section of the reactor by using a monolithic catalyst of low pressure loss, i.e., a catalyst possessed of the so-called honeycomb structure.

This monolithic catalyst is generally obtained by forming an infusible refractory inorganic carrier such as, for example, cordielite or mullite in the shape of a honeycomb structure, coating this honeycomb substrate with a thin layer of activated alumina to impart a high specific surface area thereto, and depositing a noble metal such as platinum or palladium and an oxide of a heavy metal such as cobalt or manganese on the thin layer. The monolithic catalyst in popularly used as a catalyst capable of completely oxidizing hydrocarbons and carbon monoxide.

Because of the shape of the monolithic catalyst, it is difficult to fill the reactor completely with the monolithic catalyst. Consequently, an empty space occurs inevitably between the catalyst bed and the inner wall of the reactor. Insertion of partition plates is an effective measure generally adopted for perfect isolation of the empty space and preclusion of gas leakage. When the interior temperature of the reactor is relatively low, such partition plates may be welded to provide airtight seal of the interior of the reactor. When the outlet gas temperature of the catalyst bed reaches a high level of about 680° C., however, the method of air-tight sealing by the welding of partition plates cannot be adopted. To avoid the distortion of the reaction due to the thermal expansion of the material of the reactor, the reactor must inevitably be designed so that the substrate for supporting the catalyst bed is given amply allowance for free thermal expansion or contraction instead of being directly welded to the inner wall of the reactor. As a good example befitting this purpose, there may be cited a reactor in which a catalyst bed designed in itself to preclude possible short pass of gas and a catalyst bed support attached fast to the inner wall of the reactor and designed in itself to preclude possible short pass of gas are so disposed relative to each other that they may maintain surface contact smooth enough to permit mutual expansion or contraction and obviate the distortion of the catalyst bed due to thermal expansion. Otherwise, because the air-tight sealing by welding is difficult to materialize, the only effective method may be dividing each of the partition plates into small sections and disposing these small sections side by side to warrant full absorption of thermal expansion. This method inevitably entails a complication that the adjoined edges of the sections should be prevented from producing gaps therebetween. In any event, it is next to impossible to prevent the untreated waste gas from short passing the empty space which is inevitably produced owing to the convenience of structural design of the reactor. Thus, the efficiency of the waste gas disposal is degraded or lowered to a point where perfection of the waste gas disposal can hardly be expected.

A method for preventing the empty space in the reactor from involving the short pass of the untreated waste gas by filling the empty space with a packing material such as refractory glass or asbestos has been in vogue for some time. Even if the empty space is amply filled with the packing material under the atmospheric temperature condition, the air-tightness offered by the packing inevitably becomes insufficient at the elevated temperatures of the operation. This method, therefore, has much to be desired.

An object of this invention, therefore, is to provide a method for the disposal of waste gas which permits maximum recover of heat and apparatus for use in this method.

Another object of this invention is to provide a method for the disposal of waste gas which permits effective exploitation of the waste gas resulting from the disposal and apparatus for use in this method.

Yet another object of the present invention is to provide a method for the disposal of waste gas by use of a catalytic-oxidation reactor entailing no short pass of the waste gas and apparatus for use in this method.

SUMMARY OF THE INVENTION

The objects described above are accomplished by a method for the disposal of waste gas, which method comprises (a) heating the incoming waste gas containing hydrocarbons, carbon monoxide, and other inflammable organic compounds with the gas obtained by removing heat from the outlet gas of the catalytic-oxidation reactor, (b) further heating the resultant hot waste gas with part of the outlet gas of the catalytic-oxidation reactor, (c) subjecting the heated waste gas to complete oxidation in the catalytic-oxidation reactor thereby rendering the waste gas no longer noxious, (d) diverting part of the outlet gas of the catalytic-oxidation reactor to be used for heating the aforementioned heated waste gas, (e) causing at least part of the outlet gas of the reactor which has been used for heating the waste gas to mingle with the remainder of the outlet gas of the reactor, (f) causing the remainder of the outlet gas of the reactor which has been used for heating the waste gas to mingle with the aforementioned heated waste gas, and (g) subjecting to heat recovery the mixture of the remainder of the outlet gas of the reactor with at least part of the outlet gas of the reactor which has been used for heating the waste gas.

The method described above is carried out by apparatus for the disposal of waste gas, which comprises in combination means for supplying waste gas containing hydrocarbons, carbon monoxide, and other inflammable organic compounds, a first heat exchanger connected on the inlet side thereof to the aforementioned means for waste gas supply and on the heating side thereof to a heat recovery device, a second heat exchanger connected on the inlet side thereof to the aforementioned first heat exchanger, on the heating side thereof to a catalytic-oxidation reactor, and on the heating outlet side thereof to the catalytic-oxidation reactor and to the heat recovery device, the aforementioned catalytic-oxidation reactor connected to the aforementioned second heat exchanger, and the aforementioned heat recovery device connected to the aforementioned catalytic-oxidation reactor.

PREFERRED EMBODIMENT OF THE INVENTION

Figure 1:
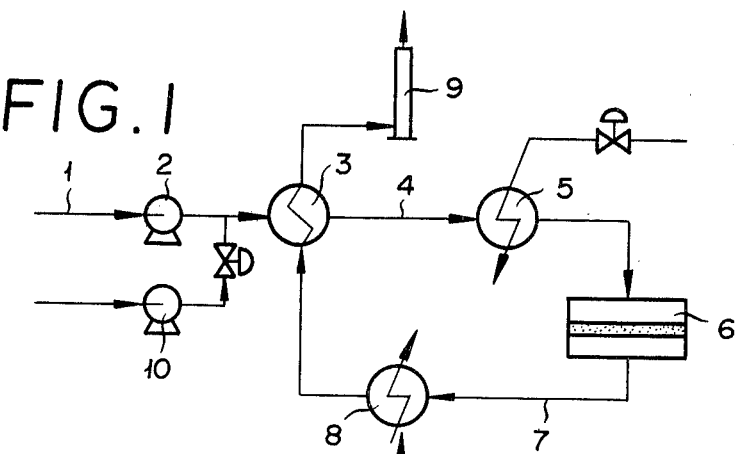
FIG. 1 and FIG. 2 are flow sheets of conventional processes for the disposal of waste gas.

Now, this invention will be described in detail herein below with reference to the accompanying drawing. By the method of this invention for the waste gas disposal, the waste gas containing hydrocarbons, carbon monoxide, and other inflammable organic compounds and brought in through a conduit 31 is sent through a booster fan 32 optionally installed to suit the occasion, heated in a first heat exchanger 33, the delivered via a conduit 34 and further heated in a second heat exchanger 44, mixed with part of the outlet gas of a catalytic-oxidation reactor 36 supplied via a conduit 46 as described more fully afterward, and subsequently forwarded to the catalytic-oxidation reactor 36, there to be completely burnt. The hot exhaust gas which results from the complete combustion within the reactor 36 is partly diverted through a conduit 37 and a conduit 40 and supplied to a second heat exchanger 44 and used therein to heat the waste gas brought in through the conduit 34. Then, part of the outlet gas supplied to the second heat exchanger 44 is forwarded via a conduit 46 to a conduit 35, there to be mixed into the heated waste gas from the second heat exchanger 44. In the meantime, the remainder of the outlet gas supplied to the second heat exchanger is circulated through a conduit 47 to the conduit 37, there to be mixed with the hot outlet gas from the catalytic-oxidation reactor 36. The mixed gas is deprived of its heat to the fullest possible extent in a heat recovery device 38. The resultant cool gas is forwarded via a conduit 48 to the first heat exchanger 33 and used therein to heat the waste gas supplied through the conduit 31. After this service, the gas is either released through a stack 39 into the air or utilized as an inert gas in some other chemical process or for sealing containers storing inflammable substances.

According to the present invention, therefore, the circulating (outlet) gas which has passed through the second heat exchanger 44 is returned in its whole volume to the inlet of the catalytic-oxidation reactor when the quantity of the heat generated by the waste gas is large. In that case, the method of this invention is substantially identical with the process of FIG. 2. The part of the waste gas to be returned to the heat recovery device 38 increases in proportion as the quantity of the heat generated by the waste gas decreases. This, in effect, is substantially equivalent to effecting heat exchange between the outlet gas of the catalytic-oxidation reactor and the outlet gas of the first heat exchanger 33. The quantity of heat to be exchanged can be controlled by the volume of the gas flowing spontaneously to the heat recovery device 38. This has substantially the same effect as the elevation of the outlet temperature of the heat exchanger 13 in the process of FIG. 2. According to the method of FIG. 3, the temperature of the exhaust gas flowing to the stack 39 is substantially constant without reference to the volume of the gas. Since the volume of the waste gas is neither increased no decreased, the heat recovery ratio can be maintained constant at a high level in a wider range of the quantity of the heat generated by the waste gas.

Figure 2:
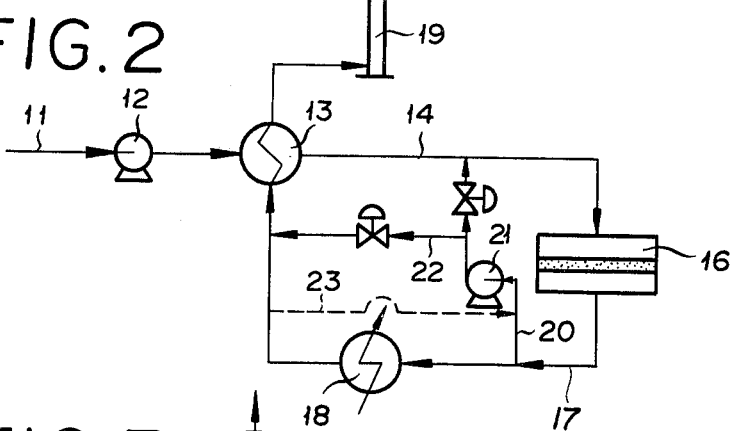
Figure 3:
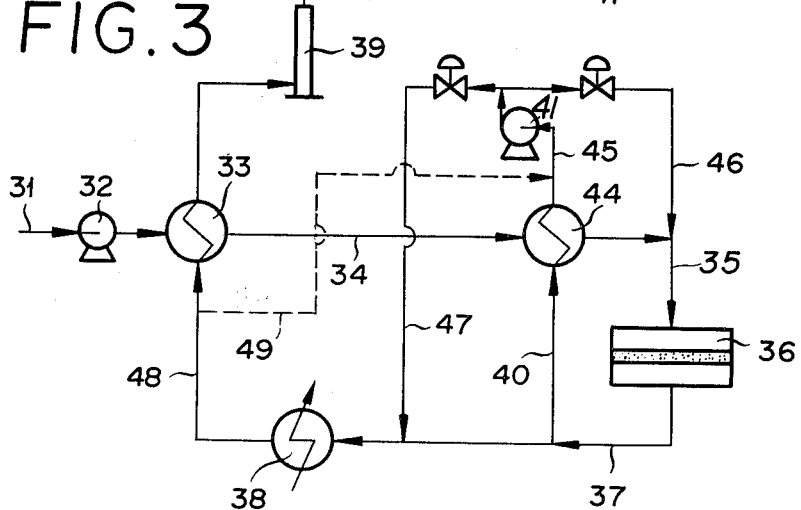
FIG. 3 is a typical process flow sheet of the waste gas disposal by the present invention.
Figure 4:
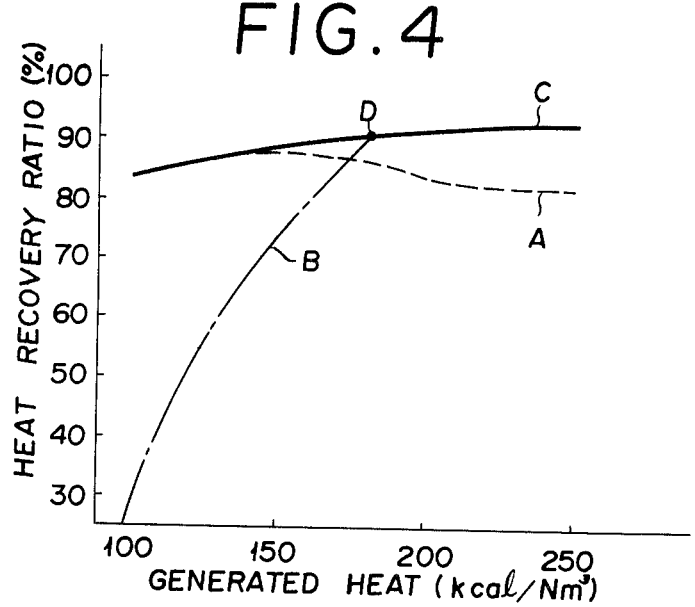
FIG. 4 is a graph showing the trends of heat recovery ratio in the processes illustrated in FIGS. 1-3.

To impart a concrete form to the description given above, the heat recovery ratios obtained of the processes of FIGS. 1-3 are compared in FIG. 4. In the graph, the curve A represents the results obtained of the process of FIG. 1, the curve B obtained of the process of FIG. 2, and curve C obtained of the process of FIG. 3. The point D represents the design point of apparatus. The operating conditions of the processes are shown below.

Quantity of heat generated by feed waste gas—250 to 100 Kcal/m$^3$ (equivalent to 780° to 310° C.)
Temperature of feed waste gas—50° C.
Inlet gas temperature of catalyst bed—250° C.
Outlet gas temperature of catalyst bed—680° C.
Temperature of air supplied from ambience—20° C.

In the processes of FIG. 1 and FIG. 3, the temperature of the gas released from the heat exchanger to the ambience could be maintained substantially in the range of from 100° to 101° C. In the process of FIG. 2, however, the temperature of the exhaust gas inevitably rises to 270° C. to 290° C. as the quantity of the heat generated decreases. This fact inconveniences the process from the practical point of view.

The description so far given represents a case wherein the quantity of the heat generated by the waste gas is such that the temperature of self elevation is not more than (680° C. minus the temperature of the feed waste gas) °C. The excellence of the present invention is evident even when the quantity of the heat generated by feed waste gas is greater than that considered above.

In the process of FIG. 1, the control of the outlet gas temperature of the catalytic oxidation reactor 36 can be effected by increasing the amount of ambient air being introduced. The fact that this measure inevitably lowers the heat recovery ratio is evident from the trend shown in the graph of FIG. 4.

In the processes of FIGS. 2 and 3, the control can be effected by using the mixture of part of the outlet gas of the catalytic-oxidation reaction with the outlet gas of the heat recovery device (as indicated by the dotted lines in FIGS. 2 and 3). In this case, in the process of FIG. 3, absolutely no gas flows through the line from the heat exchanger 44 to the heat recovery device 38. Thus, these two processes of FIGS. 2 and 3 may well be regarded as substantially equal. The heat recovery ratios obtained in the two processes, therefore, are equal. In the graph of FIG. 4, the curves of heat recovery ratio obtained of the processes of FIGS. 2 and 3, when translated toward the increasing quantity of the heat generation, will overlap, while the curve obtained of the process of FIG. 1 shows a monotonous trend of decrease.

After all, the data indicate that the process of FIG. 3 is capable of effectively coping with possible change in the quantity of the heat generated by the feed waste gas in a wide range and providing excellent heat recovery at a high level. The method and apparatus provided by the present invention, therefore, are particularly useful for the disposal of the types of waste gases such as are emanating from the plants for the production of acrylic acid by the oxidation of propylene, those for the production of acrylonitrile by the ammoxidation of propylene, and those for the production of maleic anhydride by the oxidation of benzene, for example, which generate heat in quantity in the range of from 50 to 300 Kcal/Nm$^3$, particularly 100 to 250 Kcal/Nm$^3$.

Preferably, the reactor to be used in the present invention is designed so that the empty space which occurs between the catalyst bed of a monolithic catalyst and the inner wall of the reactor and which forms a cause for the short pass of the untreated waste gas is filled up with a granular catalyst. This design is desirably accomplished by first stretching a metal net in the bottom portion of the empty space between the catalyst bed of the monolithic catalyst and the inner wall of the reactor so as to provide a safe support for the granular catalyst to be subsequently placed to fill up the empty space. Of course, the granular catalyst may be substituted with a flexible fibrous or fabric catalyst. Otherwise, the granular catalyst may be used in combination with such flexible catalyst.

Of the catalysts available for filling the empty space which occurs between the catalyst bed of the monolithic catalyst and the inner wall of the reactor, particularly desirable is the granular catalyst for complete oxidation. The granules of the catalyst may be in the fixed form of spheres circular columns, or cylinders or in the amorphous crushed form.

The granular catalyst has a salient advantage that it can be placed to fill up the empty space without being affected at all by the shape of the empty space. It has another advantage that, because of the fluidity ascribable to the granularity, this catalyst can keep the empty space filled smoothly at all times even when the empty space is deformed by thermal expansion. Even when a void occurs between the catalyst bed and the inner wall of the reactor and the unreacted waste gas finds a short pass therein, the gas thus short passed comes into contact with the granular catalyst and undergoes complete oxidation. The reactor of this construction, therefore, warrants thorough disposal of the waste gas as expected.

Figure 5:
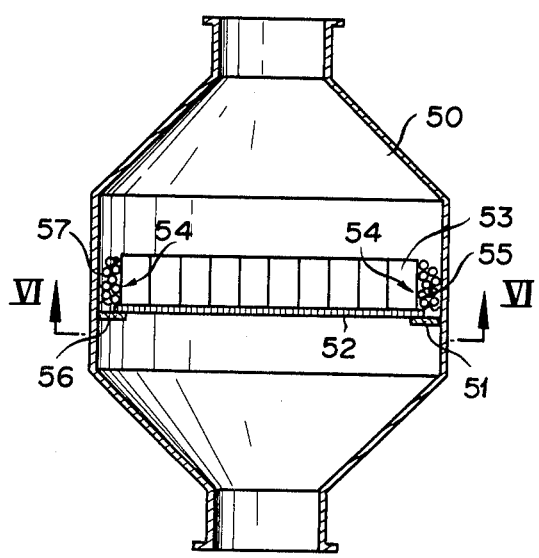
FIG. 5 is a cross section of a typical reactor to be used for the purpose of this invention.
Figure 6:
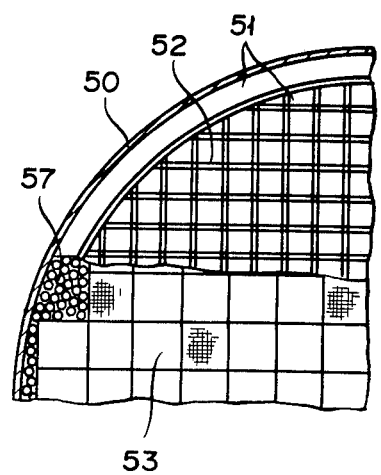
FIG. 6 is a cross section taken along the VI—VI line of the diagram of FIG. 5.

The reactor in a preferred construction for the working of this invention will be described herein below with reference to the accompanying drawing. As illustrated in FIGS. 5-6, a catalyst bed supporting member 52 is held fast in position, without being welded fast to the reactor 50, by a support member 51 which is fastened to the inner wall of the main body of the reactor 50 by means of welding, for example, and monolithic catalysts 53 are arrayed on the catalyst bed supporting member 52 within the interior of the reactor in such a manner that the hollow shafts thereof fall in the direction of the flow of the waste gas. The fastening of the catalysts to the catalyst bed supporting member 52 is generally effected by means of bolts pierced through the oblong bolt holes (not shown) perforated through the catalysts. In this construction, the catalysts are given freedom of expansion and contraction due to thermal expansion. A metal net 56 is laid in the bottom portion of the empty space 55 which occurs between the peripheral part 54 of the bed of the monolithic catalyst 53 and the inner wall of the reactor 50. This empty space 55 is filled with a granular catalyst and/or a flexible fibrous catalyst and-/or a flexible fabric catalyst 57. The catalyst bed supporting member 52 is in the form of a porous plate or grating. The cross section of the individual monolithic catalysts can be in any of the shapes such as square, rectangle, circle, and ellipsis. When there are used monolithic catalysts of a circular or elliptic cross section, there inevitably occur empty spaces in the catalyst bed. In this case, the empty spaces may be filled up with the aforementioned granular catalyst or fibrous or fabric catalyst.

These empty spaces are desired to be filled with the granular, fibrous, or fabric catalyst to a height in the range of from 50 to 100 percent based on the height of the catalyst bed of the monolithic catalysts. As the result, there is derived an advantage that because of the difference of pressure loss between the grannular, fibrous, or fabric catalyst and the monolithic catalysts, the reactor can be operated without exerting any heavy load selectively upon the catalyst filling the empty spaces.

Now, the present invention will be described more specifically below with reference to working examples.

EXAMPLE 1

In the apparatus of a construction illustrated in FIG. 3, a reactor wherein monolithic catalysts obtained by coating monolithic carriers (honeycomb carriers) of cordierite with a layer of activated alumina and subsequently depositing platinum in a dispersed state thereon were disposed to form a catalyst bed in the interior of the reactor and a granular catalyst obtained by depositing platinum on inert, refractory, spherical carriers was placed to fill up the empty space between the peripheral portion of the catalyst bed and the inner wall of the reactor was used as the catalytic-oxidation reactor 50. A waste gas emanating from a plant for the production of acrylic acid by the oxidation of propylene which was composed of 0.38 percent by volume of propane, 0.28 percent by volume of propylene, 0.14 percent by volume of other organic compounds, 0.56 percent by volume of carbon monoxide, 4.19 percent by volume of oxygen, and the balance to make up 100 percent by volume of inert gas (quantity of heat generated 170 Kcal/Nm$^3$) and which had a temperature of 50° C. was introduced via the conduit 31 at a flow rate of 100 parts by volume/hr to the first heat exchanger 33, there to be heated. Then, the hot waste gas was again heated in the second heat exchanger 44. It was mixed with the outlet gas of the reactor brought in at a flow rate of 13 parts by volume/hr via the conduit 46. The resultant mixed gas having a temperature of 250° C. was fed at a flow rate of 113 parts by volume/hr to the catalytic-oxidation reactor 36, there to be completely burnt. The treated gas emanating from the reactor had an outlet temperature of 680° C. Part of the outlet gas of the reactor was diverted via the conduit 40 to the second heat exchanger 44, there to be used for heating the waste gas fed via the conduit 34. Of the diverted part of the outlet gas, 12 parts by volume/hr was circulated via the conduit 47 to the heat recovery device 38. The remainder of the outlet gas of the reactor was delivered to the heat recovery device 38, there to be deprived of its heat. It was then forwarded to the first heat exchanger 33. Through the stack 39, the treated gas having a temperature of 100° C. was released at a flow rate of 100 parts by volume/hr into the air. In this operation, the heat recovery ratio was 90 percent. The treated gas released via the stack was composed of 10 ppm of propane, 5 ppm of propylene, 4 ppm of other organic compounds, a trace amount of carbon monoxide, 0.82 percent by volume of oxygen, and the balance to make up 100 percent by volume of inert gas.

EXAMPLE 2

In the same apparatus as used in Example 1, a waste gas emanating from a plant for the production of acrylonitrile by the ammoxidation of propylene which was composed of 0.31 percent by volume of propane, 0.19 percent by volume of propylene, a trace amount of other organic compounds, 1.2 percent by volume of carbon monoxide, 3.5 percent by volume of oxygen, and the balance to make up 100 percent by weight of inert gas (quantity of heat generated 140 Kcal/Nm$^3$) and which had a temperature of 30° C. was introduced at a flow rate of 100 parts by volume/hr via the conduit 31 to the first heat exchanger 33, there to be heated. The hot waste gas was again heated in the second heat exchanger 44 to 270° C. The hot gas was supplied to the catalytic-oxidation reactor 36 to be completely burnt. The outlet gas of the reactor had a temperature of 680° C. Part of the outlet gas of the reactor was diverted via the conduit 40 and fed at a flow rate of 32 parts by volume/hr to the second heat exchanger 44, there to be used for heating the waste gas brought in via the conduit 34. After this service, the gas was mixed with the remainder of the outlet gas of the reactor brought in via the conduit 37. The resultant mixed gas was forwarded to the heat recovery device 38 to be deprived of its heat. The resultant cool gas was forearded to the first head exchanger 33. Consequently, the treated gas having a temperature of 80° C. was released through the stack 39 at a flow rate of 100 parts by volume/hr into the air. In this operation, the heat recovery ratio was 88 percent. The gas released via the stack 39 was composed of 8 ppm of propane, 4 ppm of propylene, 3 ppm of other organic compounds, a trace amount of carbon monoxide, 0.5 percent by volume of oxygen, and the balance to make up 100 percent by weight of inert gas.

EXAMPLE 3

In the same apparatus as used in Example 1, a waste gas emanating form a plant for the production of acrylic acid by the oxidation of propylene which was composed of 0.60 percent by volume of propane, 0.33 percent by volume of propylene, a trace amount of other organic compounds, 0.50 percent by volume of carbon monoxide, 5.58 percent by volume of oxygen, and the balance to make up 100 percent by volume of inert gas (quantity of heat generated 230 Kcal/Nm$^3$) and which had a temperature of 50° C. was introduced at a flow rate of 100 parts by volume/hr via the conduit 31 to the first heat exchanger 33, there to be heated. The hot waste gas was again heated in the second heat exchanger 44. The hot waste gas emanating from the second heat exchanger 44 was mixed with the outlet gas of the reactor brought in at a flow rate of 53 parts by volume/hr via the conduit 46 to produce a mixed gas having a temperature of 250° C. This mixed gas was supplied at a flow rate of 153 parts by volume/hr to the catalytic-oxidation reactor 36 to be completely burnt therein. The gas emanating from the reactor had an outlet temperature of 680° C. Part of the outlet gas of the reactor was diverted at a flow rate of 30 parts by volume/hr via the conduit 40 to the second heat exchanger 44 and used therein for heating the waste gas introduced via the conduit 34. Part of the exhaust gas obtained after recovery of heat was supplied at a flow rate of 42 parts by volume/hr via the conduit 49 to the conduit 45. Part of this diverted exhaust gas was circulated at a flow rate of 19 parts by volume/hr via the conduit 47 to the heat recovery device 38. The remainder of the outlet gas of the reactor was treated by the heat recovery device 38, then forwarded to the first heat exchanger 33. Consequently, the treated waste gas having a temperature of 100° C. was released via the stack 39 at a flow rate of 100 parts by volume/hr. In this operation, the heat recovery ratio was 92 percent. The treated waste gas emanating from the stack 39 was composed of 12 ppm of propane, 5 ppm of propylene, 3 ppm of other organic compounds, a trace amount of carbon monoxide, 0.83 percent by volume of oxygen, and the balance to make up 100 percent by volume of inert gas.

What is claimed is:

1. A method for the disposal of waste gas containing hydrocarbons, carbon monoxide and other inflammable organic compounds, comprising the steps of:
    (a) heating said waste gas by heat exchange with the outlet gas of a catalytic-oxidation reactor to provide hot waste gas,
    (b) heating the said hot waste gas by heat exchange with a first portion of the outlet gas of said catalytic-oxidation reactor to yield heated waste gas,
    (c) subjecting the said heated waste gas to complete oxidation in said catalytic-oxidation reactor thereby rendering the gas no longer noxious and providing a stream of hot outlet gas having a first and second portion
    (d) utilizing the first portion of said outlet gas to heat said hot waste gas,
    (e) mixing a first part of said first portion of said outlet gas after its utilization for heating said hot waste gas with the remaining second portion of said outlet gas
    (f) mixing the remaining part of said first portion of said outlet gas after its utilization for heating said hot waste gas with said heated waste gas, and
    (g) subjecting to heat recovery the combined mixture of the second portion of the said outlet gas with said first part of said first portion of the outlet gas after its utilization for heating said hot waste gas.

2. A method according to claim 1, wherein the quantity of the heat generated by the waste gas is in the range of from 50 to 300 Kcal $Nm^3$.

3. A method according to claim 1, wherein the quantity of the heat generated by the waste gas is in the range of from 100 to 250 Kcal/$Nm^3$.

4. A method according to claim 1 wherein all of the outlet gas of said catalytic oxidation reactor used for heating said hot waste gas is mixed with the remainder of the outlet gas of said catalytic oxidation reactor.

5. A method according to claim 1, wherein said first portion of said outlet gas after utilization for heating waste gas, is mixed with a predetermined amount of the combined mixture outlet gas which has undergone heat recovery.

6. A method according to claim 1, wherein the outlet gas, upon exiting from said catalytic-oxidation reactor has a temperature of about 680° C.

7. A method according to claim 1, wherein the catalyst used in said catalytic-oxidation reactor is formed of monolithic catalysts.

8. A method according to claim 7, wherein the monolithic catalysts are kept fast in position in the interior of said catalytic oxidation reactor by causing the empty space formed between the peripheral portion of the catalyst bed of said monolithic catalyst and inner wall of the reactor to be filledup with at least one catalyst selected from the group consisting of granular catalyst, flexible fibrous catalyst, and flexible fabric catalyst.

* * * * *